United States Patent
Katayama

(10) Patent No.: US 8,794,285 B2
(45) Date of Patent: Aug. 5, 2014

(54) PNEUMATIC TIRE FOR MOTORCYCLE

(75) Inventor: Shinsaku Katayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 116 days.

(21) Appl. No.: 13/129,910

(22) PCT Filed: Nov. 20, 2009

(86) PCT No.: PCT/JP2009/006291
§ 371 (c)(1),
(2), (4) Date: May 18, 2011

(87) PCT Pub. No.: WO2010/058603
PCT Pub. Date: May 27, 2010

(65) Prior Publication Data
US 2011/0214792 A1    Sep. 8, 2011

(30) Foreign Application Priority Data

Nov. 21, 2008    (JP) .................................. 2008-298786

(51) Int. Cl.
*B60C 9/18*    (2006.01)

(52) U.S. Cl.
USPC ............................. 152/531; 152/526; 152/535

(58) Field of Classification Search
USPC ........................................................ 152/534
See application file for complete search history.

(56) References Cited

FOREIGN PATENT DOCUMENTS

| | | |
|---|---|---|
| EP | 2 184 187 A1 | 5/2010 |
| EP | 2 226 204 A1 | 9/2010 |
| JP | 5-178007 * | 7/1993 |
| JP | 09-226319 A | 9/1997 |
| JP | 10-53007 A | 2/1998 |
| JP | 2002-316512 A | 10/2002 |
| JP | 2003-011614 A | 1/2003 |
| JP | 2004-010005 A | 1/2004 |
| JP | 2004-067058 A | 3/2004 |
| JP | 2004-067059 A | 3/2004 |
| JP | 2006-298082 * | 11/2006 |
| JP | 2008-87627 * | 4/2008 |
| JP | 2008-114816 A | 5/2008 |
| JP | 2008-149991 A | 7/2008 |
| JP | 2008-162355 A | 7/2008 |

OTHER PUBLICATIONS

Machine translation of JP 2002-316512, 2002.*
Machine translation of JP 2004-10005, 2004.*

(Continued)

*Primary Examiner* — Justin Fischer
(74) *Attorney, Agent, or Firm* — Sughrue Mion, PLLC

(57) ABSTRACT

A pneumatic tire for motorcycle is provided which can improve the traction performance especially during sharp cornering by largely leaning a vehicle (motorbike) followed by acceleration, and the stability during leaning of a vehicle in addition to enhancing steering stability at high speed. A pneumatic tire for motorcycle having a tread portion 11 formed in a circular shape, the tread portion 11 having a crown portion which has a spiral belt layer 3 in its inside in the radial direction of the tire, the spiral belt layer having an angle of 0 to 5° with respect to the circumferential direction of the tire and an arrangement width 0.5 to 0.8 times as large as the tread width, wherein the spiral belt layer is arranged in such a manner that the center of the transverse direction of the spiral belt layer coincides with the tire equator and the curvature radius (R1) from one the end portion of the spiral belt layer to the end portion of the tread portion is larger than the curvature radius (R2) from the end portion of the spiral belt layer to the equatorial plane.

10 Claims, 5 Drawing Sheets

(56) References Cited

OTHER PUBLICATIONS

Machine translation of JP 2008-87627, 2008.*
Machine translation of JP 2008-149991, 2008.*

International Search Report PCT/JP2009/006291, Jan. 12, 2010.
Extended European Search Report issued in European Application No. 09827384.0 dated Jan. 22, 2014.

* cited by examiner

PNEUMATIC TIRE FOR MOTORCYCLE

CROSS REFERENCE TO RELATED APPLICATIONS

This application is a National Stage of International Application No. PCT/JP2009/006291 filed Nov. 20, 2009, claiming priority based on Japanese Patent Application No. 2008-298786 filed Nov. 21, 2008, the contents of all of which are incorporated herein by reference in their entirety.

TECHNICAL FIELD

The present invention relates to a pneumatic tire for motorcycles (hereinafter also referred to as simply "tire"), more particularly, a pneumatic tire for motorcycles which can improve the traction performance especially during sharp cornering by largely leaning a vehicle (motorbike) followed by acceleration, and the stability during leaning of a vehicle in addition to enhancing the steering stability at high speed.

BACKGROUND ART

Since, in a high performance tire for motorcycles, the rotation speed of the tire becomes high, the tire is largely affected by the centrifugal force, leading to outward expansion of the tread portion of the tire and thereby to a reduced steering stability in some cases. Therefore, a tire structure has been developed wherein a reinforcement member comprising an organic fiber or steel (spiral member) is wound around the tread portion of a tire such that it is almost in parallel with the equatorial plane of the tire.

Examples of the spiral member used in this spiral belt layer include nylon fibers, aromatic polyamides (product name: Kevlar) and steels. Among these, recent interest has focused on aromatic polyamides and steels since they do not elongate and are capable of reducing expansion of the tread portion even at a high temperature. In cases where such a spiral member is wound around the crown portion of a tire, the so called "hoop" effect (an effect which prevents, by constraining the crown portion of a tire with a spiral member, expansion of a tire due to the centrifugal force even when the tire rotates at a high speed, thereby allowing a high steering stability and durability to be exerted) can be enhanced, so that many technologies related to improvement of these spiral members have been proposed so far (e.g., Patent Documents 1 to 5).

Tires wound by these spiral members are known to be excellent in the steering stability at a high speed and exhibit a very high traction. However, in terms of the turning performance during leaning largely of a vehicle (motorbike), winding a spiral member does not cause drastic improvement in the steering stability. Therefore, consumers, and riders who participate in races sometimes demand for improvement of the grip performance during leaning largely of a motorbike.

RELATED ART DOCUMENT

Patent Document

Patent Document 1: Japanese Unexamined Patent Application Publication No. 2004-067059
Patent Document 2: Japanese Unexamined Patent Application Publication No. 2004-067058
Patent Document 3: Japanese Unexamined Patent Application Publication No. 2003-011614
Patent Document 4: Japanese Unexamined Patent Application Publication No. 2002-316512
Patent Document 5: Japanese Unexamined Patent Application Publication No. 09-226319

DISCLOSURE OF THE INVENTION

Problems To Be Solved By the Invention

Since the body of a motorcycle is leaned to make turns, in a pneumatic tire for motorcycles, the area on the tread portion of the tire which contacts the ground is different between the case of proceeding straight ahead and the case of turning. That is, characteristically, the center portion of the tread portion is used when a motorcycle is proceeding straight ahead, and an edge portion of the tread portion is used when it turns. Therefore, the shape of the tire is much rounder than a tire for a passenger car. Due to this rounded crown shape (the shape of the tread portion of a tire is called crown shape), a pneumatic tire for motorcycles has the following unique characteristics especially during turning.

Concerning the turning performance of a tire of a motorcycle required when the body of the motorcycle is largely leaned, a grip is generated by contacting one of the edges of the tread of the tire with the road surface. When a motorcycle turns with its body largely leaned, the tire contacts the ground as shown in FIG. 7. The contact shape observed in this case will be discussed. As shown in the figure, the state of deformation of the tread is different in the contact shape between the area near the center and the area near a tread edge. In terms of deformation of the tread in the rotational direction of a tire (also referred to as the circumferential direction of a tire or front-back direction of a tire), deformation near the center of the tire is in a driving state and deformation near a tread edge of the tire is in a braking state.

As used herein, the term "driving state" means a sheared state wherein, assuming a tire sliced along the equatorial direction, the tread is deformed such that the lower surface of the tread (surface contacting a skeletal member in the tire) is sheared backwardly in the direction of travel of the tire and the tread surface contacting the road surface is deformed forwardly in the direction of travel of the tire, which deformations occur when a driving force has just been applied to the tire. On the other hand, the term "braking state" has the opposite meaning to the driving state, and means a sheared state wherein the tread is deformed such that the inner side (belt) of the tire is sheared forwardly and the tread surface contacting the road surface is deformed backwardly, which corresponds to the movement of the tire during braking.

As shown in FIG. 7, when a motorcycle turns while being leaned at a large angle such as a camber angle (CA) of 45°, even in cases where the tire is rotating with neither a driving force nor a braking force applied to the tire, the contact region near the tread center is in a driving state and the contact region near a tread edge is in a braking state. This is due to the difference in the radius of the belt portion of the tire (radius difference). Since a tire for motorcycles has a largely-rounded crown portion, the distance from the rotation axis to the belt is largely different between the tread center portion and tread edge portions. In the case shown in FIG. 7, the radius RA at the position near the center in the contact shape is obviously larger than the radius RB at the position near the tread edge portion in the contact shape. Because the angular velocity of a rotating tire is the same, the velocity at the belt portion (which means the velocity of the tire in the tire equatorial direction along the road surface, when the tire contacts a road surface; which is a product of the belt radius and the angular velocity of the tire) is higher in the case of RA wherein the radius is larger. Although the tread surface of the tire is not sheared in the longitudinal direction at the moment of the contact with the road surface, it undergoes shear deformation in the longitudinal direction when it proceeds along with the rotation of the tire while contacting the road surface followed by becoming apart from the road surface. In this case, the area of the tread near the tire center at which the velocity of the belt is high undergoes shear deformation of a driving state, while the tread edge portion of the tire at which the velocity of the belt is low undergoes breaking state. This is the pattern of deformation of a tread in the longitudinal direction.

Since such ineffective deformations during turning cause opposite shear deformations on the tread including those in the forward and backward directions, unnecessary motions are included to cause inefficiency in the grip ability of the tire during turning. Ideally, if all the deformations of the tread contacting the ground exhibit the same motion, the grip ability is highest, but there are cases where the above-described ineffective deformations occur and the grip ability is not generated depending on the place where the tread contacts the ground. For example, when a motorcycle is accelerated with its tires being leaned, a driving force is applied to each tire, and in this case, the area of the tread near the center which is already in the driving state immediately exerts a driving grip when the driving force is applied to the tire, but the area at the tread edge which is already in the breaking state cannot easily contribute to the driving force because it needs to be once recovered from the breaking deformation into the neutral state, followed by shifting to the deformation in the driving side. A large traction force is required for a tread edge to be in the driving state, and acceleration to apply a driving force to the tire for applying such a traction force easily causes slippage of the area of the tread near the tire center which is already in the driving state, leading to the state of spinning without gripping.

In relation to the above-described problems, it is considered that a traction force can be exerted even on the tread edge portions if the tread deformation in the tire shoulder portions (tread edge portions) which are originally in the breaking side is made to be in the driving side as much as possible. One solution to achieve this is to accelerate the velocity of the belt in the tread edge portions. However, as mentioned above, the velocity of the belt depends on the belt radius, and a belt having a large radius is inappropriate for tires for motorcycles. In view of this, it is considered that as for the tread edge portions, the velocity of the belt can be increased by enabling the belt to easily extend in the equatorial direction after contacting the ground. That is, during turning at a large CA, if the center-side half of the contact shape has a structure with which the belt does not extend in the equatorial direction and the tread edge-side half of the contact shape has a structure with which the belt extends in the equatorial direction, the belt in the tread side extends after contacting the ground and hence the velocity of the belt in the tread edge side increases, thereby reducing the breaking deformation in the tread edge side. As a result, the traction performance at a large CA (acceleration after turning by leaning the motorbike largely) is enhanced.

Usually, in a conventional tire for motorcycles, a spiral belt layer is wound around the entire area of the tread. In such a tire, the belt in the shoulder portions of the tread cannot be extended in the equatorial direction. In view of this, if the spiral belt layer is arranged only in the center side without being wound in the regions of the tread edges, the traction grip is enhanced at a large CA, that is, during turning at a large camber angle because the velocity of the belt in the tread edge increases. Further, increase in the velocity of the belt in the tread shoulder portion at a large CA means that the velocity of the belt in the tread shoulder becomes close to the velocity of the belt in the tread center side, thereby suppressing the ineffective motions of the tread contacting the ground. That is, the tread which originally had shears in the opposite directions is made to have shears in the same direction, so that the ineffective motions are eliminated and occurrence of partial abrasion can be reduced. Further, since the spiral belt layer is arranged in the tread center portion, expansion of the tire due to the centrifugal force during high speed driving (driving at a high speed means that the motorbike is standing upright) can be suppressed, and as a result, the steering stability at a high speed can be maintained to the same extent as in a tire having a full-width spiral belt layer.

However, in cases where the spiral belt layer is not wound in the range of the edge portion of the tread, the area having no spiral belt is suddenly made to contact the ground when the body is being leaned. This causes a sudden change in grip (a change of the rigidity step), so that the rider feels the step and cannot further lean the body, which is problematic.

Thus, an object of the present invention is to provide a pneumatic tire for motorcycles which can improve the traction performance especially during sharp cornering by largely leaning a vehicle (motorbike) followed by acceleration, and the stability during leaning of a vehicle in addition to enhancing the steering stability at high speed.

Means for Solving the Problems

From the point of view mentioned above, the present inventor further studied to discover that the above problem can be solved by setting a curvature radius of the portion where a spiral belt layer is not wound, thereby completing the present invention.

That is, the present invention is related to a pneumatic tire for motorcycles having a tread portion formed in a circular shape, the tread portion having a crown portion which has a spiral belt layer in its inside in the radial direction of the tire, the spiral belt layer having an angle of 0 to 5° with respect to the equatorial direction of the tire and an arrangement width 0.5 to 0.8 times as large as the tread width, wherein the spiral belt layer is arranged in such a manner that the center of the transverse direction of the spiral belt layer coincides with the tire equator and the curvature radius (R1) from the end portion of the spiral belt layer to the end portion of the tread portion is larger than the curvature radius (R2) from the end portion of the spiral belt layer to the tire equatorial plane.

In the present invention, it is preferred that a shoulder portion reinforcement belt layer is arranged adjacent to the spiral belt layer in an arrangement width of 0.5 to 2.0W, where W is the width of the portion having no spiral belt layer in the tread portion, and the shoulder portion reinforcement layer has an angle of 10° or more and 90° or less with respect to the equatorial direction of the tire. In addition, in the present invention, it is preferred that the shoulder portion reinforcement belt layer is arranged symmetrically with respect to the tire equator when the angle of the shoulder portion reinforcement belt layer is less than 90°. Further, in the present invention, it is preferred that a belt intersecting layer comprising an organic fiber is arranged adjacent to the spiral belt layer, which belt intersecting layer is wider than the spiral belt layer and has an angle of 30° or more and less than 85° with respect to the equatorial direction of the tire. Furthermore, it is preferred that a belt reinforcement layer comprising an organic fiber cord having an angle of 85° to 90° with respect to the equatorial direction of the tire is arranged between the tread layer and the spiral belt layer such that the belt reinforcement layer is adjacent to the tread layer, in a width of 90% or more and 110% or less with respect to the tread width. Furthermore, it is preferred that a shock absorbing rubber layer having a thickness of 0.3 to 1.5 mm is arranged inside of the belt reinforcement layer in the radial direction of the tire such that the shock absorbing rubber layer is adjacent to the belt reinforcement layer.

Effect of the Invention

According to the present invention, by providing the above constitution, a pneumatic tire for motorcycles can be provided which can improve the traction performance especially during sharp cornering by largely leaning a vehicle (motorbike) followed by acceleration, and the stability during leaning of a vehicle in addition to enhancing the steering stability at high speed.

BEST MODE FOR CARRYING OUT THE INVENTION

Preferred embodiments of the present invention will be described concretely referring to diagrams.

Figure 1:
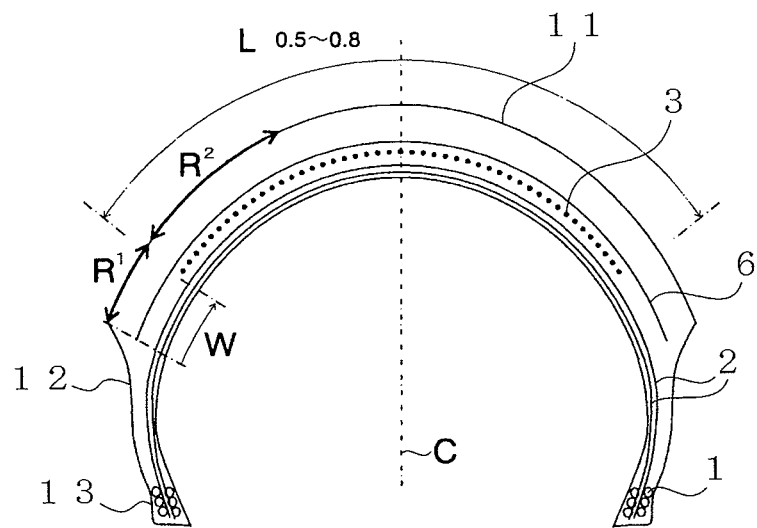
FIG. 1 is a cross-sectional view in the transverse direction showing a pneumatic tire for motorcycles according to one preferred embodiment of the present invention.

FIG. 1 shows a cross-sectional view of a pneumatic tire for motorcycles, in the transverse direction, of one preferred example of the present invention. As shown in the figure, the pneumatic tire for motorcycles of the present invention comprises a tread portion 11 formed in a circular shape, a pair of side wall portions 12 arranged from its both edges to their inside in the radial direction of the tire, and bead portions 13 lying inside the side wall portions 12 in the radial direction of the tire, in addition to at least one, two in the example shown in the figure, carcass(es) 2 extending between a pair of bead cores (comprising bead wires 1, in the example shown in the figure) embedded in each bead portion 13, which carcass(es) reinforce(s) these respective portions.

As shown in the figure, in the tire of the present invention, a spiral belt layer 3 having an angle of 0 to 5° with respect to the equatorial direction of the tire and an arrangement width 0.5 to 0.8 times as large as the tread width is arranged in the radial direction of the tire inside the crown portion of the tread portion 11. Here, the tread width corresponds to the distance on the surface of the curve from one tread edge to the other tread edge along the surface of the tire. The above setting of the width is based on the portion which contacts the ground at a CA of about 50° when the motorbike is leaned to the maximum extent and the portion which contacts the ground when the motorbike is slightly raised.

Figure 7:
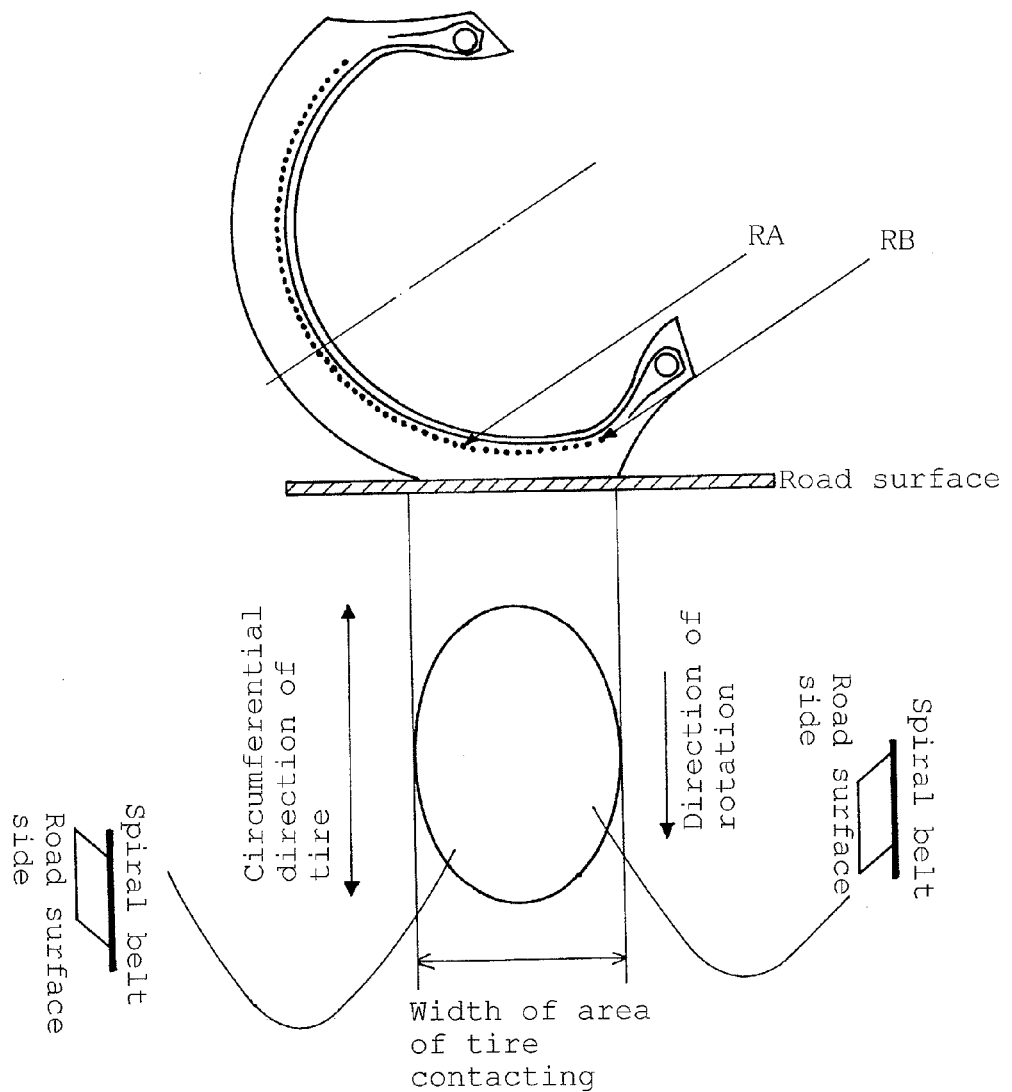
FIG. 7 is a cross-sectional view showing a tire for a motorcycle immediately under the load during turning at a large CA (CA of 50°).

When the motorbike is turned at a CA of 50°, only the area of the tread shoulder portion having a width 0.2 to 0.25 times as large as the full width of the tread is contacting the ground (see FIG. 7). This corresponds to about one quarter of the full width. As mentioned above, it is demanded that a spiral belt be wound around the tread center portion to prevent extension of the skeletal member on the area contacting the ground in the circumferential direction at a large CA, while the spiral belt be not wound around the tread edge sides to make the skeletal member to positively extend in the equatorial direction at a large CA. A half of the area contacting the ground at a large CA has a width 0.1 times as large as the tread width, and in cases where a spiral belt is not wound around the area having this width, the area having a width 0.1 times as large as the tread width in each of the both edge portions lacks the spiral belt, so that an upper limit of the spiral belt layer width is 0.8 times as large as the tread width.

The above-described upper limit is an ideal value for the case at contacting the ground where the motorbike is leaned to the maximum extent. However, acceleration of a motorbike is characterized by the process wherein, after the motorbike is leaned to the maximum extent, acceleration is begun, followed by raising the body gradually, that is, the portion contacting the ground gradually moves to the center side. Further, the maximum acceleration of a motorbike occurs at a CA within the range of 30° to 45° rather than at a CA of 50° at which the motorbike is leaned to the maximum extent. Considering that the traction performance should be highest at this time, the spiral belt layer width is preferably smaller than the above-described width 0.8 times as large as the tread width. Thus, the lower limit of the spiral belt layer width was set to 0.5 times as large as the tread width. In cases where the spiral belt layer width is 0.5 times as large as the tread width, the spiral belt layer edge is expected to be positioned at the center of the portion in the transverse direction contacting the ground at a CA of 30° to 40°. In cases where the spiral belt layer width is smaller than 0.5 times as large as the tread width, the position shifts from the center of the contact shape in the transverse direction at a CA of 30° to 40°, which is not preferred. This means that the spiral belt layer width is too small.

Thus, there are following characteristics. That is, when the arrangement width of the spiral belt layer 3 is at the upper limit, that is, 0.8 times as large as the tread width, the edge portion of the spiral belt layer can be positioned at the center of the contact shape at a CA of about 50° at which the motorbike is leaned to the maximum extent, and the grip enhancement effect is improved during the initial acceleration. Further, the effect is higher at a low-speed corner at which the motorbike is leaned largely (a motorbike can be largely leaned at a low-speed corner). On the other hand, when the arrangement width of the spiral belt layer 3 is at the lower limit, that is, 0.5 times as large as the tread width, the edge portion of the spiral belt layer can be positioned at the center of the contact shape when the motorbike is slightly raised (at a CA of 30° to 40°), so that the grip enhancement effect can be exerted from the initial acceleration until the middle phase of acceleration when the body was slightly raised. Further, the grip enhancement effect is exerted at a high-speed corner at which the motorbike is not so largely leaned. In addition, in the present invention, the spiral belt layer 3 is arranged in such manner that the center of the transverse direction of the spiral belt layer 3 coincides with the tire equator. Thus, the reinforcement direction can be equal in right and left when a body is leaned.

As a cord constituting the spiral belt layer 3, both an organic fiber cord and a steel cord can be employed. In case of the organic fiber cord, for example, a cord produced by twisting aromatic polyamides (product name: Kevlar), nylons, aromatic polyketones or the like can be used. In case of the steel cord, for example, a cord produced by twisting 5 steel wires having a diameter of 0.20 mm, or steel wires having a diameter of 0.4 mm without twisting can be used.

According to the present invention, it is essential that the curvature radius (R1, hereinafter also referred to as simply "SCR") from the end portion of the spiral belt layer to the end portion of the tread portion is larger than the curvature radius (R2, hereinafter also referred to as simply "CCR")) from the end portion of the spiral belt layer to the tire equatorial plane C. In cases where the arrangement width of the spiral belt layer 3 is small as in the present constitution, the area having no spiral belt (where the in-plane shearing rigidity of the belt decreases) is suddenly made to contact the ground when the body is being leaned, unlike in cases where the spiral belt covers the full width of the tread. Therefore, a sudden change in grip occurs when the body was leaned to the maximum extent, so that the rider feels a step and cannot further lean the body, which is problematic. To reduce such a sharp rigidity step, the curvature radius (SRC) of the portion having no spiral belt layer is enlarged to make the surface shape flatter. In cases where SCR is smaller than CCR, the tire is demanded to bend more, when the tire becomes flat by contacting the ground, because the curvature of the surface shape becomes larger. Therefore, the rider may feel that the rigidity is low due to this deformation amount. Thus, as in the present constitution, by making the surface shape flatter, it makes possible to contact the ground with a little bend. As a result, the rider comes to feel that the rigidity is high. In addition, by employing the present constitution, the change in grip occurs smoothly, the rider can lean the body without uncomfortable feeling.

Further, in the present invention, SCR from the edge portion of the spiral belt layer 3 to the edge portion of the tread portion 11 is set to be larger than any CCR from the edge portion of the spiral belt layer 3 to the tire equatorial plane C. In the present invention, SRC may be larger than CCR as a single R, or may become larger toward the edge portion of the tread portion 11.

Furthermore, in the present invention, it is preferred that SCR/CCR which is the ratio of SCR and CCR satisfies a relation of $$1 < SCR/CCR < 5.0,$$

more preferably, a relation of $$1.2 \leq SCR/CCR \leq 4.0.$$

By satisfying such a relation, the sudden rigidity step can be reduced more. In cases where SCR/CCR is 1.0 or less, the effect of the present invention can not be obtained. On the other hand, in cases where SCR/CCR is 5.0 or more, the design of the crown may become difficult, which is not preferred.

Figure 2:
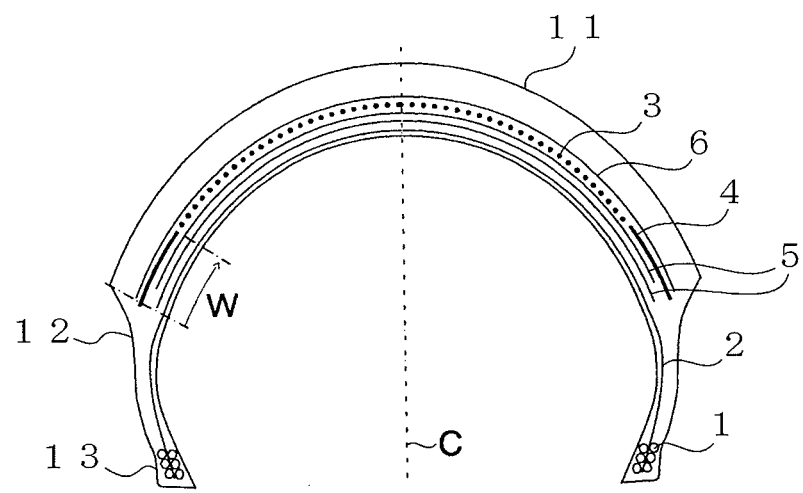
FIG. 2 is a cross-sectional view in the transverse direction showing a pneumatic tire for motorcycles according to another preferred embodiment of the present invention.

FIG. 2 shows a pneumatic tire for motorcycles according to another preferred embodiment of the present invention. In the present invention, it is preferred that at least one shoulder portion reinforcement belt layer 4 is arranged at where the spiral belt layer 3 is not arranged. As in the present constitution, by arranging shoulder portion reinforcement belt layer 4, it becomes possible to reduce the rigidity step more. By reducing the rigidity step, the shear strain applied to the edge of the spiral belt layer 3 can also be reduced, so that breakage accidents which are likely to occur in the edges can be prevented.

Further, in the present invention, it is preferred that at least one shoulder portion reinforcement belt layer 4 is arranged adjacent to the spiral belt layer 3 in an arrangement width of 0.5 to 2.0W, where W (W=(tread width−spiral belt width)/2) is the width of the portion having no spiral belt layer 3 in the tread portion 11. The shoulder portion reinforcement belt layer 4 is arranged to reduce the rigidity step, so that the effect can not be obtained when the width thereof is too small. Therefore, it is necessary that the width of the shoulder portion reinforcement belt layer 4 is 0.5W or more, where W is the width of the portion having no spiral belt layer 3 in the tread portion. 0.5W is the lower limit that the effect can be obtained. In addition, as for the upper limit, in case of 1.0W or more, the shoulder portion reinforcement belt layer 4 extends to the tire side portion, and the effect becomes small. Although the effect is small, the effect can be obtained, so that the upper limit is 2.0W according to the result of the example. It is preferably in the range of 0.6W to 1.2W.

Furthermore, in the present invention, it is preferred that the angle of the shoulder portion reinforcement layer 4 is 10° or more and 90° or less with respect to the equatorial direction of the tire. In cases where the angle of the shoulder portion reinforcement belt layer 4 is less than 90°, it is preferred that the shoulder portion reinforcement belt layer 4 is arranged symmetrically with respect to the tire equator. The rigidity step which a rider feels when the body is leaned occurs by disappearing of the spiral belt layer 3. To make up the in-plane shearing rigidity lost by disappearing of the spiral belt layer 3, a single shoulder layer reinforcement belt layer comprising an organic fiber having an angle is sufficient to obtain the effect. In addition, even if a belt having an angle of 90° which hardly has the rigidity with respect to equator direction is used, the effect to make up the rigidity can be obtained because the thickness increases by one belt layer. Therefore, the upper limit of the angle of the shoulder portion reinforcement belt layer is set to 90°. On the other hand, as the angle of the shoulder portion reinforcement belt layer approaches the angle of the spiral belt 3, the effect of making up the in-plane shearing rigidity increases. In case of 10° or less, however, the function of the shoulder portion reinforcement belt layer 4 becomes almost same as that of the spiral belt layer 3. Therefore, the lower limit of the angle of the shoulder portion reinforcement belt layer 4 is set to 10° for not inhibiting a growth of the shoulder portion largely. In addition, in cases where the angle of the shoulder portion reinforcement layer 4 is less than 90°, it is preferred that the shoulder portion reinforcement layer 4 is arranged symmetrically with respect to the tire equator to make the reinforcement direction equal in right and left when the body is leaned.

Figure 3:
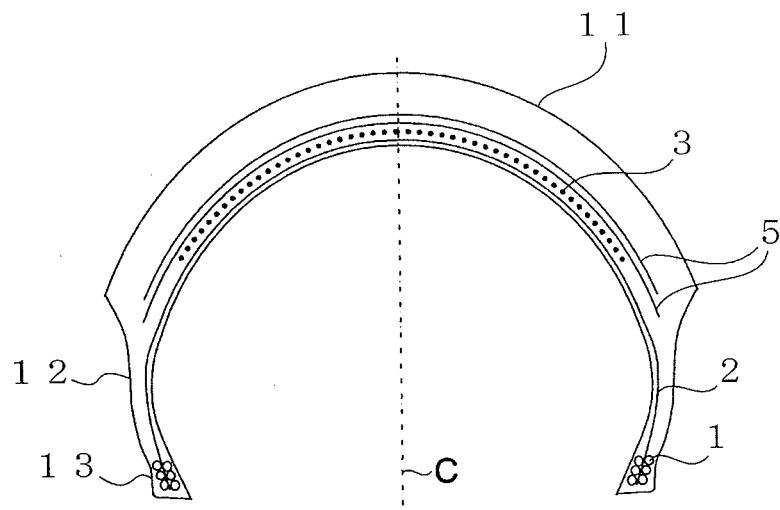
FIG. 3 is a cross-sectional view in the transverse direction showing a pneumatic tire for motorcycles according to still another preferred embodiment of the present invention.

FIG. 3 shows another preferred example of the pneumatic tire for motorcycles of the present invention. As shown in the figure, in the present invention, a belt intersecting layer 5 is preferably arranged adjacent to the spiral belt layer 3, which belt intersecting layer 5 is wider than the spiral belt layer and has an angle of not less than 30° and less than 85° with respect to the equatorial direction of the tire. This is because, if the belt intersecting layer 5 does not exist in the shoulder portions at the both edge portions where the spiral belt is not wound, the shearing rigidity of the belt is low and the belt is too weak, leading to decrease in the grip ability during turning.

If the angle with respect to the equatorial direction is less than 30°, it results in a direction close to the angle of the spiral belt layer 3, so that the belt characteristically hardly extends in the equatorial direction (circumferential direction) of the tire. In this case, this is against the object of the present invention wherein the belt in the shoulder portions is allowed to extend in the equatorial direction in the area where the belt intersecting layer is arranged. Therefore, if the angle of the belt is less than 30°, the skeletal member hardly extends in the equatorial direction in the shoulder portions and the velocity of the belt in the shoulder portions does not increase, leaving the tread in the shoulder portion to be in the breaking deformation, so that traction grip can be hardly obtained. On the other hand, if the angle of the belt in the shoulder portions is larger than 85°, a sufficient intersecting effect (an effect to enhance the in-plane shearing rigidity of belts yielded by laminating the belts in the opposite directions with each other) as the belt intersecting layer 5 cannot be obtained and hence the in-plane rigidity of the belt in the shoulder portions is insufficient, so that a sufficient turning grip cannot be obtained. The angle is more preferably not less than 45° at which the skeletal member easily extends in the equatorial direction. Further, it is preferably not more than 80° in view of exertion of the shearing rigidity. Thus, it is more preferably not less than 45° and not more than 80°.

As the material for the belt intersecting layer 5, an organic fiber cord is used. This is because, if a cord having rigidity also in the direction of compression of the cord, such as a steel cord is arranged as the belt intersecting layer, the skeletal member characteristically hardly bends in the out-of-plane direction, and the area contacting the ground is small, so that the grip ability decreases. An organic fiber cord does not have a high rigidity in terms of compression in the direction of the cord, so that the rigidity of the skeletal member in the out-of-plane direction can be reduced to secure a large area contacting the ground, and in addition, an organic fiber cord has a high rigidity in the direction of pulling of the cord, which allows effective enhancement of the shearing rigidity. As the organic fiber cord used for the belt intersecting layer 5, the same organic fiber cord as the one used for the spiral belt layer 3 can be used. In the present invention, the belt intersecting layer 5 may be either arranged in the outside of the spiral belt layer 3 in the radial direction of the tire as shown in FIG. 3 or arranged in the inside of the spiral belt layer 3 in the radial direction of the tire (not shown). The order of arrangement of these layers is not restricted as long as the belt intersecting layer 4 is arranged adjacent to the spiral belt layer 3.

Further, in the present invention, as shown in FIG. 1, a belt reinforcement layer 6 comprising organic fiber cords having an angle of 85° to 90° with respect to the equatorial direction of the tire is preferably arranged between the tread layer and the spiral belt layer 3 such that the belt reinforcement layer 6 is adjacent to the tread layer 11. The rigidity step is large at the border between the portion where the spiral belt layer 3 is present and the portion where the spiral belt layer 3 is absent. To reduce the step, the belt reinforcement layer is arranged adjacent to the tread layer continuously from the tire center to the tire shoulder as an outermost layer. By this, the step can be made to be hardly felt.

The reason why the angle of the belt reinforcement layer 6 was set to 90° with respect to the equatorial direction of the tire is that, by arranging the cord along the transverse direction, the step can be effectively made to be hardly felt. Here, the reason why the angle ranges between 85° to 90° is that a manufacturing error may be included therein. Further, the arrangement width of the belt reinforcement layer 6 is set to not less than 90% and not more than 110% with respect to the full width of the tread. The purpose of the belt reinforcement layer 6 is to make the step to be hardly felt, that is, to make the belt in the outermost layer to be hardly segmented, by covering the edge portion of the spiral belt with the member. Therefore, preferably, it has a large arrangement width and is arranged such that the entire area of the tread is covered therewith. If the arrangement width is not less than 90% with respect to the full width of the tread, the step of the spiral belt can be sufficiently covered. In terms of the upper limit, the arrangement width may exceed the tread width, and hence the belt reinforcement layer 5 may reach the side wall portions. However, in cases where the arrangement width is larger than 110%, the belt exists also in the side wall portions of the tire at 90°, so that the side wall may be hardly bent and the tire may be hard (that is, since the tire is hardly bent, the ride quality performance may be worse). Therefore, the upper limit was set to 110%.

The reason why the material of this belt reinforcement layer 6 is an organic fiber is that the cross section of a tire for motorcycles is highly circular, so that in cases where a steel which has rigidity in the direction of compression of the cord in the transverse direction of the tire is employed, the tire is hardly bent, leading to a reduced area contacting the ground. Since an organic fiber has low rigidity in the direction of compression of the cord, the area contacting the ground does not decrease.

Since the reason why the belt reinforcement layer 6 is provided is to eliminate the step in the edge portions of the spiral belt, if the diameter of the cord should not be too small, a sufficient effect can not be obtained. On the other hand, in cases where the diameter of the cord is too large, even an organic fiber has rigidity in the direction of compression of the cord, so that a cord which is too thick is also not preferred. Therefore, the diameter of the cord for the belt reinforcement layer 6 is preferably not less than 0.5 mm and not more than 1.2 mm.

Figure 4:
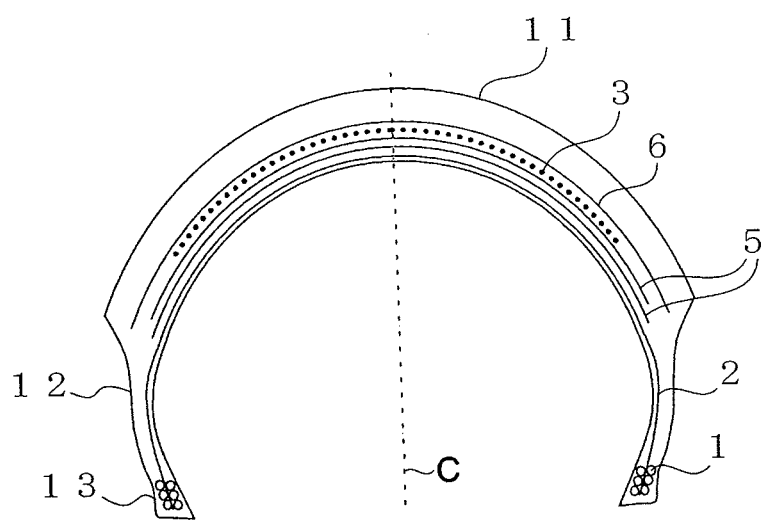
FIG. 4 is a cross-sectional view in the transverse direction showing a pneumatic tire for motorcycles according to still another preferred embodiment of the present invention.

Here, as mentioned above, the belt intersecting layer 5 may be provided either inside or outside the spiral belt layer 3, so that in terms of the order of arrangement of these layers with the belt reinforcement layer 6, in cases where the belt intersecting layers 5 exists inside the spiral belt layer 3, the belt reinforcement layer 6 is placed immediately outside the spiral belt layer 3 (see FIG. 4). On the other hand, in cases where the belt intersecting layers 5 exists outside the spiral belt layer 3, the belt reinforcement layer 6 is placed immediately outside the outer belt intersecting layer 5 out of the two belt intersecting layers 5 (not shown). In either case, it is necessary to arrange the belt reinforcement layer 6 immediately inside the tread portion 11, adjacent to the tread portion 11.

Figure 5:
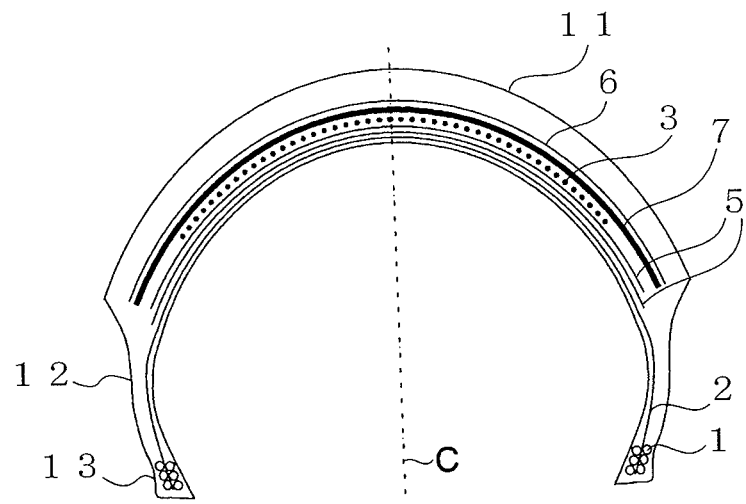
FIG. 5 is a cross-sectional view in the transverse direction showing a pneumatic tire for motorcycles according to still another preferred embodiment of the present invention.

FIG. 5 shows a cross-sectional view of a pneumatic tire for motorcycles according to another preferred example of the present invention. In the present invention, when the belt reinforcement layer 6 is arranged, it is preferred to arrange, as shown in the figure, a shock absorbing rubber layer 7 having a thickness of 0.3 to 1.5 mm inside the belt reinforcement layer 6 in the radial direction of the tire, adjacent to the belt reinforcement layer 6. This shock absorbing rubber layer 7 has an effect to reduce abrasion of the tread in the shoulder portion.

In FIG. 7, motions in the transverse direction of the tread which occur when the tire is turned at a CA of 50° were shown, but on the other hand, deformation in the circumferential direction of the tread is different between the region at the tread edge portions and the region in the tread center portion in the area where the tread is contacting the ground in FIG. 7. This is due to different velocities of the belt in the center-side region in the contact shape and the tread edge-side region in the contact shape. A tire for motorcycles has a large roundness in the cross section in the transverse direction. Thus, the belt radius which is the distance from the rotation axis to the belt is larger in the tread center-side region. Therefore, the velocity of the tire, that is, the velocity of the belt during the process wherein: the tread contacts the ground; the rotation of the tire proceeds; and the tread becomes apart from the road surface; is higher in the tread center-side region. This is because the velocity of the belt is a product of the belt radius and the angular velocity of the rotating tire. Due to the difference in the velocity of the belt in the circumferential direction, the tread in the center side of the tire is in the driving state, while the tread edge-side region of the tire is in the breaking state (as mentioned above).

In the present invention, as mentioned above, by reducing the width of the spiral belt, the belt in the portions where the spiral belt is not arranged is allowed to extend in the circumferential direction when it contacts the ground, and the velocity of the belt is enhanced, leading to reduction of ineffective deformations of the tread. However, even in cases where the ineffective deformations are reduced by reducing the width of the spiral belt layer, the ineffective deformations cannot be completely eliminated.

In cases where the shock absorbing rubber layer 7 is provided inside the belt reinforcement layer 6 in the radial direction of the tire, the shock absorbing rubber layer 7 is subjected to shear deformation in the circumferential direction, so that the above-described driving deformation and breaking deformation are taken over from the tread, leading to further reduction of deformations of the tread in the circumferential direction. On the other hand, since the shock absorbing rubber layer 7 has on its upper surface the belt reinforcement layer 6 along the transverse direction of the tire, it is less likely to be subjected to shear deformation in the transverse direction of the tire. Therefore, deformation of the tread in the transverse direction of the tire is not taken over, so that the shear deformation in the transverse direction remains large even by arrangement of the shock absorbing rubber layer 7. That is, the shock absorbing rubber layer 6 takes over only deformation in the circumferential direction of the tire and reduces deformation of the tread in the circumferential direction to further enhance the grip ability, and on the other hand, it does not take over deformation in the transverse direction of the tire and has an effect to keep deformation of the tread in the transverse direction large, thereby keeping a high lateral force. In cases where, as in the present invention, the width of the spiral belt is reduced and such a shock absorbing rubber layer 7 is provided, ineffective deformations of the tread in the circumferential direction of the tire can be further reduced, which is largely effective and very preferred. The belt reinforcement layer 6 and the shock absorbing rubber layer 7 are preferably arranged widely especially over the range of not less than 90% (especially, not more than 110%) with respect of the tread width.

In the tire of the present invention, only the points satisfying the above conditions of the spiral belt layer and the above conditions of the curvature radius are important, and by this, the desired effects of the present invention can be obtained. Other conditions including the tire structure, the materials and the like are not restricted.

For example, the carcass 2 constituting the skeleton of the tire of the present invention comprises at least one carcass ply wherein relatively highly elastic textile cords are arrayed in parallel to each other. The number of the carcass ply may be either one or two, and may be three or more. In terms of the method for fixation of the carcass 2, its both edges can be either anchored by being held from the both sides by bead wires 1 as shown in FIG. 1 or anchored by being folded up from inside of the tire to the outside of the tire around the bead cores (not shown). Further, an inner liner is arranged in the innermost layer of the tire (not shown), and a tread pattern is formed as appropriate on the surface of the tread portion 11 (not shown). The present invention is applicable to not only radial tires but also biased tires.

EXAMPLES

The present invention will be described concretely by way of Examples.

Examples 1

Pneumatic tires for motorcycles having a tire size of 190/50ZR17 and the cross-sectional structure as shown in FIG. 1 were prepared according to the following conditions. Test tire was provided with carcasses comprising two carcass plies (body plies) extending toroidally between a pair of bead cores. Here, a nylon fiber was used as the carcass plies. The two carcasses were angled in the radial direction (at an angle of 90° with respect to the equatorial direction). The edges of carcass plies were anchored by being held by bead wires from the both sides in the bead portions.

A spiral belt layer was arranged outside the carcasses in the radial direction of the tire. The spiral belt layer was manufactured by spirally winding a steel cord produced by twisting steel wires having a diameter of 0.18 mm in 1×5 type in the tire equatorial direction. The spiral belt layer was arrayed in parallel and embedded in a covering rubber was wound spirally approximately along the circumferential direction of the tire in the direction of the tire rotation axis with an end count of 50 cords/50 mm. In addition, the total width of the spiral belt layer was 170 mm which was 0.71 times as large as the full tread width of 240 mm.

Further, the tire surface shape was formed in such a way that the curvature radius (SCR) from the edge portion of the spiral belt layer to the edge portion of the tread portion was larger than the curvature radius (CCR) from the end of the spiral belt layer to the tire equatorial plane.

Furthermore, a belt reinforcement layer comprising aromatic polyamide fibers having an angle of 90° with respect to the equatorial direction of the tire was arranged outside the spiral belt layer in the radial direction of the tire. Cords having a diameter of 0.7 mm which were produced by twisting the aromatic polyamide fibers were arranged at an angle of 90° with respect to the circumferential direction of the tire with an end count of 50 cords/50 mm. The width was set to the same with the tread width. A tread layer having a thickness of 7 mm was arranged outside this belt reinforcement layer in the radial direction of the tire.

Example 2

A tire of the Example 2 was prepared in the same manner as in Example 1 except that the width of the spiral belt layer was 120 mm (0.5 times of the tread overall width).

Example 3

A pneumatic tire for motorcycles having the cross-sectional structure as shown in FIG. 3 was prepared according to the following conditions. A single carcass ply was used and arranged in the radial direction (at an angle of 90° with respect to the equatorial direction). Further, a spiral belt layer exists outside the carcass ply in the radial direction of the tire. Materials and the end count of the spiral belt layer were the same as Example 1. Two belt intersecting layers were arranged outside the spiral belt layer in the radial direction of the tire (Simply, "intersecting layer", in the tables 1 and 2). The belt intersecting layers were formed by arranging cords having a diameter of 0.5 mm which were produced by twisting the aromatic polyamide fibers with an end count of 50 cords/50 mm. The angles of the belt intersecting layers were set to ±60° with respect to the equatorial direction and hence the layers were made to be intersected with each other. The arrangement width of the belt intersecting layer was 250 mm in terms of the first one (in the inner side) and 230 mm in terms of the second one (in the outer side). A belt reinforcement layer having an angle of 90° with respect to the equatorial direction was not arranged outside the belt intersecting layer in the radial direction. Excepting that, the tire of Example 3 is prepared in the same manner as in Example 1.

Example 4

A pneumatic tire for motorcycles having the cross-sectional structure as shown in FIG. 4 was prepared according to the following conditions. A single carcass ply was used and arranged in the radial direction. Further, two belt intersecting layers which were the same as those in Example 3 were arranged inside the spiral belt layer in the radial direction of the tire. Therefore, in this case, the belt intersecting layers existed immediately outside the carcass in the radial direction of the tire, and the spiral belt layer existed outside the belt intersecting layers in the radial direction of the tire. The constitution of the spiral belt layer was the same as in Example 3. A belt reinforcement layer (Simply, "outermost reinforcement layer" in the tables 1,2) having an angle of 90° with respect to the equatorial direction of the tire existed outside the spiral belt layer in the radial direction of the tire. The constitution of the outermost belt reinforcement layer was the same as in Example 1. A tread existed outside the outermost belt reinforcement layer in the radial direction of the tire.

Example 5

A tire of Example 5 was prepared in the same manner as in Example 4 except that the belt reinforcement layer was not arranged outside the spiral belt layer in the radial direction of the tire.

Example 6

A pneumatic tire for motorcycles having the cross-sectional structure as shown in FIG. 5 was prepared according to the following conditions. A shock absorbing rubber layer (Simply, "rubber layer" in the tables 1, 2) having a thickness of 0.6 mm was arranged inside the outermost belt reinforcement layer in the radial direction of the tire. Materials of the shock absorbing rubber layer were the same as a coating rubber used for the belt reinforcement layer. The arrangement width of the shock absorbing rubber layer was also set to 240 mm which was the same as the arrangement width of the belt reinforcement layer. Excepting that, the tire of Example 6 was prepared in the same manner as in Example 4.

Examples 7 to 12

Pneumatic tires for motorcycles having the cross-sectional structure as shown in FIG. 2 were prepared according to the following conditions. As for the tire of Example 7, was the tire which a shoulder portion reinforcement layer was added to the tire of Example 4. The shoulder portion reinforcement belt comprised an aromatic polyamide fiber (Kevlar) having an angle of 45° with respect to the equatorial direction and was arranged in the portion having no spiral belt layer of the tread edge portion. The shoulder portion reinforcement belt layers were arranged in reverse separated V shape with respect to the rotational direction with the arrangement width of 35 mm at the both edge portions of the tread. As for the tires of Examples 8 to 12, the reinforcement belt of the tire of Example 7 was exchanged.

Conventional Examples 1

Figure 6:
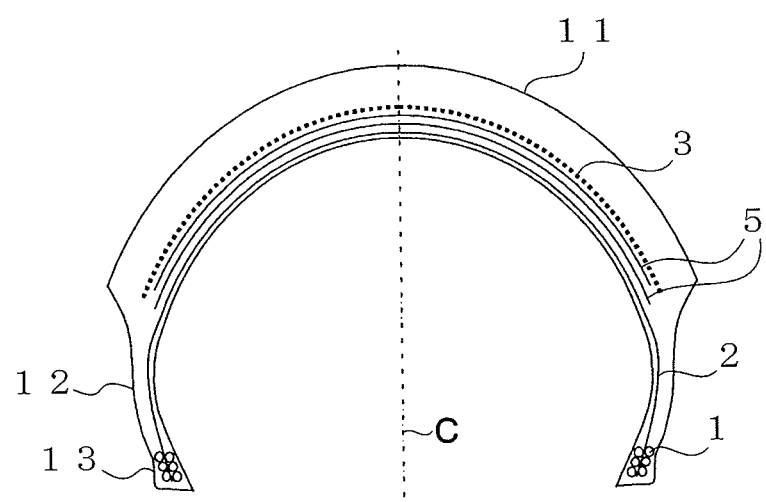
FIG. 6 is a cross-sectional view in the transverse direction showing a pneumatic tire for motorcycles according to a conventional embodiment.

A pneumatic tire for motorcycles having the cross-sectional structure as shown in FIG. 6 were prepared according to the following conditions. A single carcass ply was used and arranged in the radial direction. Belt intersecting layers were arranged outside the carcass in the radial direction of the tire. In addition, materials of the belt intersecting layers were the same as Example 3. A single spiral belt layer was arranged outside the belt intersecting layers in the radial direction of the tire. The spiral belt was a steel belt, and had an end count of 50 cords/50 mm.

Conventional Example 2

A tire of Conventional Example 2 was the same as the tire of Conventional Example 1 except that the belt intersecting layers were not arranged. Also two carcass plies were arranged in the radial direction.

Comparative Example 1

A tire of Comparative Example 1 was prepared in the same manner as in Example 4 except that the curvature radius (SCR) from the end of the spiral belt layer to the end of the tread portion was the same as the curvature radius (CCR) from the end of the spiral belt layer to the tire equatorial plane.

Comparative Example 2

A tire of Comparative Example 2 was prepared in the same manner as in Comparative Example 1 except that the width of the spiral belt layer was 100 mm.

Example 13

A tire of Example 13 was prepared in the same manner as in Example 7 except that the arrangement width W of the shoulder portion reinforcement belt layer was 0.49W.

Example 14

A tire of Example 14 was prepared in the same manner as in Example 7 except that the angle of the shoulder portion reinforcement belt (organic fiber cords) was 0°.

Each obtained test tire was tested under the following conditions. The structures of the tires in Examples 1 to 14, Comparative Examples 1 and 2, and Conventional Examples 1 and 2 are shown in the tables 1, 2. Here, reverse separated V shape in the column of the shoulder portion reinforcement belt means that the angle of the shoulder portion reinforcement belt was arranged in reverse separated V shape with respect to the rotational direction of the tire, and separated V shape in the column of the shoulder portion reinforcement belt means that the angle of the shoulder portion reinforcement belt was arranged in separated V shape with respect to the rotational direction of the tire.

<Drum Test>

First, enhancement of traction during leaning of the body, which is a primary object of the present invention, was measured using a drum. The method of measurement of traction using a drum is as follows.

In terms of the testing machine, sandpaper was put on a drum having a diameter of 3 m, and the surface of the sandpaper was used as a mimic of the surface of the road. This drum was rolled at a speed of 150 km/h, and a tire was pressed thereon at a CA of 35° and a CA of 50°. Each test tire was inflated to an internal pressure of 240 kPa, and the tire was pressed at a load of 1.47 kN tire was connected to a chain which transmitted power to the rotation axis, and driving force could be applied therethrough. The driving force was applied using a motor. The tire was allowed to rotate at 80 km/h and driving force was applied to linearly accelerate the tire to 120 km/h for 3 seconds. At this time, since the drum was rolling at 80 km/h, the tire was in a state where driving force was applied thereto, so that traction under a condition where the body was leaned could be measured.

Figure 8:
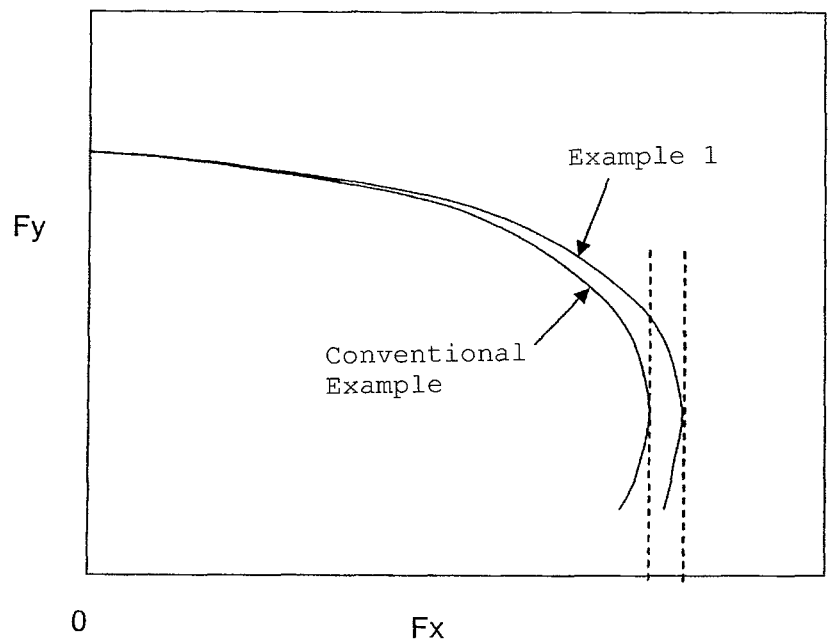
FIG. 8 is a graph showing a friction ellipse showing the relationship between Fx and Fy.

The force acting parallel to the rotation axis of the tire (that is, the transverse direction of the tire) and the force acting vertically with respect to the rotation axis of the tire were respectively measured by a force sensor placed at the wheel center of the tire. Each of these forces was resolved into the force in the transverse direction of the drum and the force in the rotational direction of the drum based on the camber angle, and the force in the transverse direction of the drum was defined as Fy and the force in the rotational direction of the drum was defined as Fx (Fx, Fy are coordinates with respect to the ground). That is, Fy represents the lateral force to turn the motorbike and Fx represents the driving force to accelerate the motorbike, respectively. By taking Fx along the abscissa and Fx along the ordinate, the waveform as shown in FIG. 8 is obtained. This is called a friction ellipse, wherein the intercept of Fy at Fx=0 represents the pure lateral force at a driving force of 0, which is a force called camber thrust. In the present test, the grip performance of a tire in a traction state can be evaluated by acceleration of the rotation of the tire by application of driving force to the tire. In the waveform of the graph, Fx moves in the positive direction with time. The maximum value of Fx can be said to be an index of traction grip.

Defining the maximum value of Fx of the CA35° of Example 1 as 102 and the maximum value of Fy of the CA50° of the Example 1 as 103, the performances of other Examples were evaluated using the index. This evaluation was carried out for two standards, that is, a CA of 35° and a CA of 50°. The results are shown in the table 3 below.

<Driving Test Using Real Motorcycle>

To confirm the performance-improvement effect of the tires for motorcycles of the present invention, a test for comparison of the drivability was carried out using a real motorcycle. The results will be described. Because the test tires were for the rear wheel, only the rear tire was changed in the test using a real motorcycle. As the front tire, a conventional tire was consistently used. The evaluation method will be described as follows.

Each test tire was installed on a 1000 cc sport motorcycle, and the motorcycle was made to travel a test course to comprehensively evaluate steering stability (cornering performance) according to the 10-point scoring system based on feeling of the test rider. On the course, hard driving was carried out in view of motorcycle races, and the maximum velocity reached 180 km/h. Three items, that is, the traction performance at a low-speed corner (acceleration performance from the state where the body was largely leaned at a speed of 50 km/h), traction performance at a high-speed corner (acceleration performance from the state where the body was slightly leaned at a speed of 120 km/h), and grip stability during leaning of the body (sense of discontinuity) were tested. The obtained test results are summarized and shown in the table 3 below.

TABLE 1

| | | | Tire structures | | |
|---|---|---|---|---|---|
| | Carcass | Intersecting layer | CR shape of tire surface (SCR, CCR)[*1] Shoulder portion reinforcement belt (arrangement width of spiral) | Outermost reinforcement layer | Rubber layer |
| Example 1 | Two plies, 90° | No | CR shape SCR/CCR ( 2.5 ) [*2] Spiral width 170 mm ( 0.71) [*3] | Yes | No |
| Example 2 | Two plies, 90° | No | CR shape SCR/CCR ( 2.5 ) [*2] Spiral width 120 mm ( 0.50) [*3] | Yes | No |
| Example 3 | single ply, 90° | Two layers 60° Outside the spiral | CR shape SCR/CCR ( 2.5 ) [*2] Spiral width 170 mm ( 0.71) [*3] | No | No |
| Example 4 | Single ply, 90° | Two layers, 60° Inside the spiral | CR shape SCR/CCR ( 2.5 ) [*2] Spiral width 170 mm ( 0.71) [*3] | Yes | No |
| Example 5 | Single ply, 90° | Two layers, 60° Inside the spiral | CR shape SCR/CCR ( 2.5 ) [*2] Spiral width 170 mm ( 0.71) [*3] | No | No |
| Example 6 | Single ply, 90° | Two layers, 60° Inside the spiral | CR shape SCR/CCR ( 2.5 ) [*2] Spiral width 170 mm ( 0.71) [*3] | Yes | Yes |
| Example 7 | Single ply, 90° | Two layers, 60° Inside the spiral | CR shape SCR/CCR ( 2.5 ) [*2] Angle 45° single (separated V shape) Width 35 mm (1.0) [*4] Spiral width 170 mm ( 0.71) [*3] | Yes | No |
| Example 8 | Single ply, 90° | Two layers, 60° Inside the spiral | CR shape SCR/CCR ( 2.5 ) [*2] Angle 45° single (separated V shape) Width 20 mm (0.6) [*4] Spiral width 170 mm ( 0.71) [*3] | Yes | No |
| Example 9 | single ply, 90° | Two layer 60° inside the spiral | CR shape SCR/CCR ( 2.5 ) [*2] Angle 45° single (separated V shape) Width 70 mm (2.0) [*4] Spiral width 170 mm ( 0.71) [*3] | Yes | No |

TABLE 1-continued

| | | | Tire structures | | |
|---|---|---|---|---|---|
| | Carcass | Intersecting layer | CR shape of tire surface (SCR, CCR)*1 Shoulder portion reinforcement belt (arrangement width of spiral) | Outermost reinforcement layer | Rubber layer |
| Example 10 | Single ply, 90° | Two layers, 60° Inside the spiral | CR shape SCR/CCR ( 2.5 ) *2 Angle 90° single Width 35 mm (1.0) *4 Spiral width 170 mm ( 0.71) *3 | Yes | No |
| Example 11 | Single ply, 90° | Two layers, 60° Inside the spiral | CR shape SCR/CCR ( 2.5 ) *2 Angle 10° single (separated V shape) Width 35 mm (1.0) *4 Spiral width 170 mm ( 0.71) *3 | Yes | No |
| Example 12 | Single ply, 90° | Two layers, 60° Inside the spiral | CR shape SCR/CCR ( 2.5 ) *2 Angle 45° single (reverse separated V shape) Width 35 mm (1.0) *4 Spiral width 170 mm ( 0.71) *3 | Yes | No |

*1 CR: Curvature Radius
*2 The numerical value in the parenthesis is SCR/CCR.
*3 The numerical value in the parenthesis is a ratio of width of the spiral belt layer with respect to the tread width.
*4 The numerical value in the parenthesis is a ratio of width of the shoulder part reinforcement belt layer with respect to W.

TABLE 2

| | | | Tire structures | | |
|---|---|---|---|---|---|
| | Carcass | Belt intersecting layer | CR shape of tire surface (SCR, CCR)*1 Shoulder portion reinforcement belt (arrangement width of spiral) | Outermost reinforcement layer | rubber layer |
| Comparative Example 1 | Single ply, 90° | Two layers, 60° Inside the spiral | CR shape SCR/CCR ( 1.0 ) *2 Spiral width 170 mm ( 0.71) *3 | Yes | No |
| Comparative Example 2 | Single ply, 90° | Two layers, 60° Inside the spiral | CR shape SCR/CCR ( 1.0 ) *2 Spiral width 100 mm ( 0.42) *3 | Yes | No |
| Example 13 | Single ply, 90° | Two layers, 60° Inside the spiral | CR shape SCR/CCR ( 2.5 ) *2 Angle 45° single (separated V shape) Width 17 mm (0.49) *4 Kevlar Spiral width 170 mm ( 0.71) *3 | Yes | No |
| Example 14 | Single ply, 90° | Two layers, 60° Inside the spiral | CR shape SCR/CCR ( 2.5 ) *2 Angle 0° single (spiral) Width 35 mm (1.0) *4 Kevlar Spiral width 170 mm ( 0.71) *3 | Yes | No |
| Conventional Example 1 | Single ply, 90° | Two layers, 60° Inside the spiral | Total width of spiral 240 mm (1.0 of the total width) | No | No |
| Conventional Example 2 | Two plies, 90° | No | Total width of spiral 240 mm (1.0 of the total width) | No | No |

TABLE 3

| | Results of drum test | | Results of driving test using real motorcycle | | |
|---|---|---|---|---|---|
| | Friction ellipse at CA 35° | Friction ellipse at CA 50° | Driving perform-ance at high-speed | Driving perform-ance at low-speed corner | Stability during leaning |
| Example 1 | 102 | 103 | 6 | 6 | 8.5 |
| Example 2 | 105 | 100 | 7 | 5 | 8.5 |
| Example 3 | 110 | 109 | 8 | 8 | 8.0 |
| Example 4 | 114 | 112 | 9 | 8 | 8.5 |
| Example 5 | 110 | 108 | 8 | 8 | 8.0 |
| Example 6 | 118 | 117 | 10 | 10 | 9.5 |
| Example 7 | 114 | 112 | 9 | 8 | 9.0 |
| Example 8 | 114 | 112 | 8 | 7 | 8.0 |
| Example 9 | 113 | 111 | 8 | 6.5 | 9.5 |
| Example 10 | 112 | 110 | 9 | 8 | 8.5 |
| Example 11 | 110 | 108 | 8.5 | 7.5 | 9.5 |
| Example 12 | 114 | 112 | 9 | 8 | 9.0 |
| Comparative Example 1 | 114 | 112 | 8 | 7 | 5.0 |
| Comparative Example 2 | 104 | 99 | 6 | 4 | 4.0 |
| Example 13 | 114 | 112 | 8 | 7 | 6.0 |
| Example 14 | 99 | 100 | 5 | 5 | 9.0 |
| Conventional Example 1 | 97 | 98 | 4 | 4 | 9.0 |
| Conventional Example 2 | 94 | 92 | 2 | 2 | 9.0 |

It is evident that the stabilities during leaning of all examples were largely enhanced in compared to Comparative Example 1 in which only the width of the spiral belt layer was narrowed without satisfying the requirements of the curvature radius (CR) of the present invention. It is confirmed that the effect to reduce the rigidity step by the CR shape was excellent.

In Examples 1, there is no intersecting belt. Therefore, the production cost can be saved. In terms of comparison with that having no intersecting belt, Examples 1 had enhanced Fx indices at a CA of 35° and a CA of 50° compared to Conventional Example 2, and exhibited better traction performances both at a low-speed corner and at a high-speed corner in the test using a real motorcycle.

Examples 3 and 5 have two intersecting belts. Both of these show larger enhancement effect on the traction performance compared to Conventional Examples 1 and 2.

By comparison between Example 4 and Example 6, it is confirmed that the traction performance was enhanced by the shock absorbing rubber layer.

From the relationships among Examples 4, 5, and 6, the effects of the outermost belt reinforcement layer and the shock absorbing rubber layer on the stability during leaning can be seen. By adding the outermost belt reinforcement layer and the shock absorbing rubber layer respectively, the rigidity step further decreased and the stability further increased.

From Examples 1 and 2, the effect of the arrangement width of the spiral belt layer can be seen. In cases where the width of the spiral belt is large, a better Fx index at a large CA can be obtained, that is, a large effect can be obtained at a low-speed corner where the body is largely leaned at a large CA. However, in the case of the full tread width as in Conventional Examples 1 and 2, there is no effect on enhancement of the traction performance. On the other hand, in cases where the width of the spiral belt is small, a large effect can be obtained at a small CA, that is, at a high-speed corner at a CA of about 35°. However, in cases where the width of the spiral belt is too small as in Comparative Example 2, the effect cannot be obtained.

By comparison between Example 4 and Example 7, the effect of the shoulder portion reinforcement belt layer can be seen. By adding the reinforcement belt, the stability during leaning further increased.

From the relationships among Examples 7 to 9 and Examples 13, the effect of the arrangement width of the shoulder portion reinforcement belt layer can be seen. For the stability during leaning, the effect of the arrangement width of the shoulder portion reinforcement belt layer could be obtained when the width of the shoulder portion reinforcement belt layer was set to around 0.6W with respect to the width W of the portion at which the spiral belt layer was not arranged. On the other hand, the effect was hardly obtained when the width was less than 0.5W. Further, in the case of 2.0W, the effect is larger than the case of 1.0W slightly, so that it was effective to arrange the shoulder portion reinforcement belt layer more widely to reduce rigidity step. As a result, it can be said to be preferred that the arrangement width of reinforcement belt layer is around 0.5W to 2.0W.

From the relationships among Examples 7, 10, 11 and 14, the effect of the angle of the shoulder portion reinforcement belt layer can be seen. The effect to reduce the rigidity step could be obtained even when the angle was 90°. Further, the effect to reduce the rigid step became large as the angle decreased. In case of the spiral belt having an angle of 0°, however, the velocity up of the belt of the shoulder portion was obstructed, so that the driving performance largely decreased. Therefore, as for the reinforcement belt layer, it is effective that the angle is 10 to 90°.

From the relationships between Examples 7 and 12, the effect of the direction of the reinforcement belt layer with respect to the rotational direction can be seen. In cases where the reinforcement belt layer was arranged symmetrically with respect to the tire equator, the stability during leaning was not affected even when the angle of the reinforcement belt layer was set in reverse separated V shape or in separated V shape, any of which could attain the same effect to enhance the stability during leaning.

In Example 6, the outermost belt reinforcement layer and the shock absorbing rubber layer were added to the CR shape of the present invention. The present evaluation gave good results for all of the traction performance and the stability during leaning indicating that enhancement of the performances could be achieved at higher levels compared to Conventional Examples. Further, the stability during leaning of the body was higher than that in Conventional Examples wherein the spiral belt layer was arranged also in the edges, so that a superior effect obtained by combining the present invention can be seen.

From the results above, it was revealed that the present invention enables achievement, at higher levels, of both steering stability (traction performance) during turning by largely leaning the body and stability during leaning of the body.

DESCRIPTION OF SYMBOLS

1. Bead core
2. Carcass
3. Spiral belt layer
4. Shoulder portion reinforcement belt layer
5. Belt intersecting layer
6. Belt reinforcement layer
7. Shock absorbing rubber layer
11. Tread portion
12. Side wall portion
13. Bead portion
C. Tire equator plane

The invention claimed is:

1. A pneumatic tire for motorcycles having a tread portion formed in a circular shape, said tread portion having a crown portion which has a spiral belt layer (3) in its inside in the radial direction of the tire, said spiral belt layer having an angle of 0 to 5° with respect to the equatorial direction of the tire and an arrangement width 0.5 to 0.8 times as large as the tread width, wherein said spiral belt layer is arranged in such a manner that the center of the transverse direction of said spiral belt layer coincides with the tire equator and the curvature radius (R1) from the end portion of said spiral belt layer to the end portion of the tread portion is larger than the curvature radius (R2) from the end portion of said spiral belt layer to the tire equatorial plane, and further comprising a belt reinforcement layer (6) positioned radially outside of said spiral belt layer (3) and extending in the transverse direction beyond both end portions of said spiral belt layer (3), wherein a shoulder portion reinforcement belt layer is arranged adjacent to said spiral belt layer in an arrangement width of 0.5 to 2.0 W, where W is a width of the portion having no spiral belt layer in said tread portion, the shoulder portion reinforcement belt layer exists only outside of said spiral belt layer in the transverse widthwise direction, and said shoulder portion reinforcement layer has an angle of 10° or more and 90° or less with respect to the equatorial direction of the tire.

2. The pneumatic tire for motorcycles according to claim 1, wherein said shoulder portion reinforcement belt layer is arranged symmetrically with respect to the tire equator when an angle of the shoulder portion reinforcement belt layer is less than 90°.

3. The pneumatic tire for motorcycles according to claim 1, wherein a belt intersecting layer comprising an organic fiber is arranged adjacent to said spiral belt layer, which belt intersecting layer is wider than said spiral belt layer and has an angle of 30° or more and less than 85° with respect to the equatorial direction of the tire.

4. The pneumatic tire for motorcycles according to claim 3, wherein a cord layer consists of said spiral belt layer and said belt intersecting layer arranged in the outside of the spiral belt layer in the radial direction of the tire.

5. The pneumatic tire for motorcycles according to claim 3, wherein a cord layer consists of said spiral belt layer and said belt intersecting layer arranged in the inside of the spiral belt layer in the radial direction of the tire.

6. The pneumatic tire for motorcycles according to claim 3, wherein a cord layer consists of said spiral belt layer, said belt intersecting layer arranged in the inside of the spiral belt layer in the radial direction of the tire, and said belt reinforcement layer arranged in the outside of the spiral belt layer in the direction of the tire.

7. The pneumatic tire for motorcycles according to claim 1, wherein said belt reinforcement layer comprises an organic fiber cord having an angle of 85° to 90° with respect to the equatorial direction of the tire and is arranged between said tread layer and said spiral belt layer such that the belt reinforcement layer is adjacent to said tread layer, in a width of 90% or more and 110% or less with respect to the tread width.

8. The pneumatic tire for motorcycles according to claim 7, wherein a shock absorbing rubber layer having a thickness of 0.3 to 1.5 mm is arranged inside of said belt reinforcement layer in the radial direction of the tire such that the shock absorbing rubber layer is adjacent to said belt reinforcement layer.

9. The pneumatic tire for motorcycles according to claim 1, wherein the ratio of R1 and R2 satisfies a relation of $1<R1/R2<5.0$.

10. The pneumatic tire for motorcycles according to claim 1, wherein the arrangement width is 0.71-0.80 times as large as the tread width.

* * * * *